INVENTORS
THOMAS E. FLACTIFF
MELVIN R. HOLMES
BY Cameron, Kerkam & Sutton
ATTORNEYS INVENTORS
THOMAS E. FLACTIFF
MELVIN R. HOLMES
BY Cameron, Kerkam & Sutton
ATTORNEYS

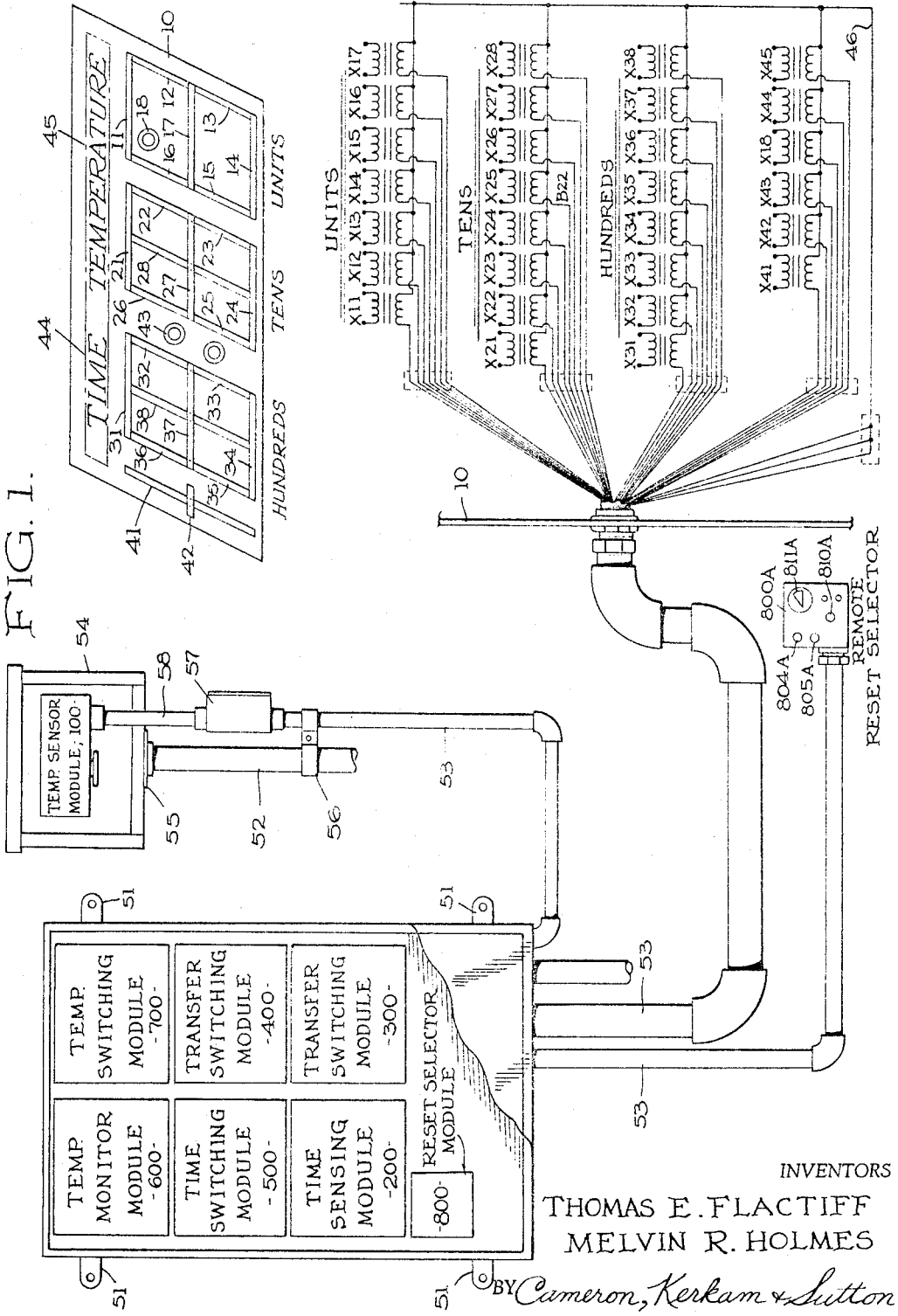

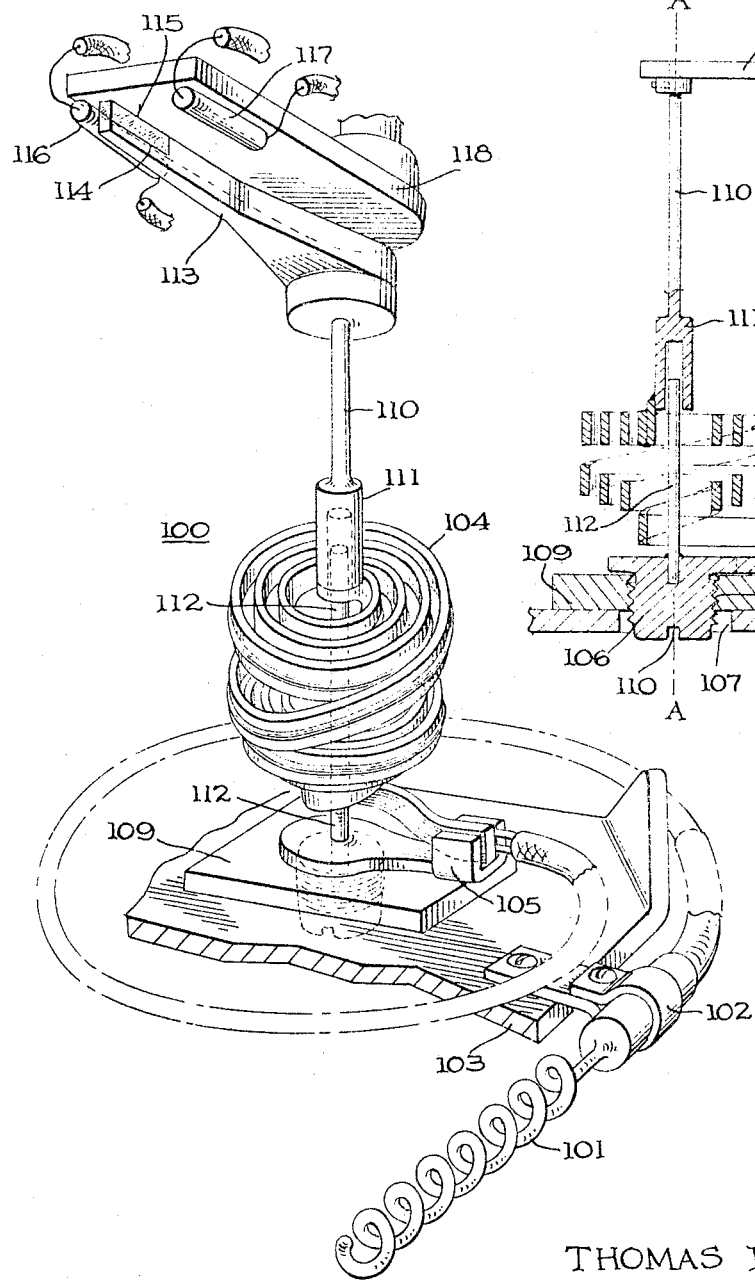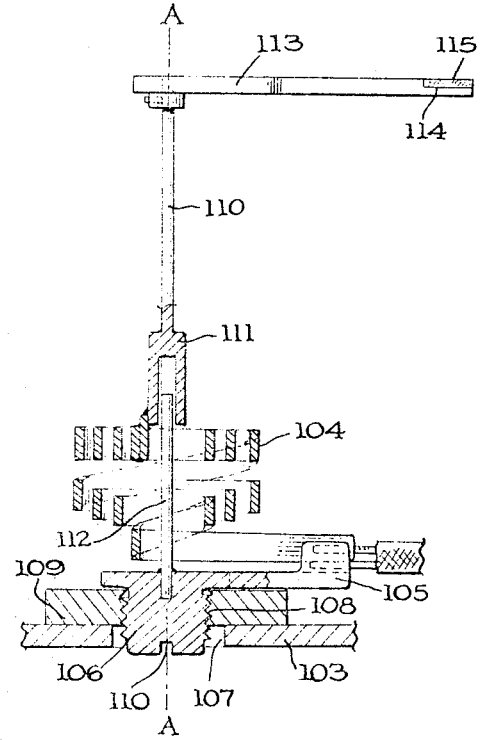

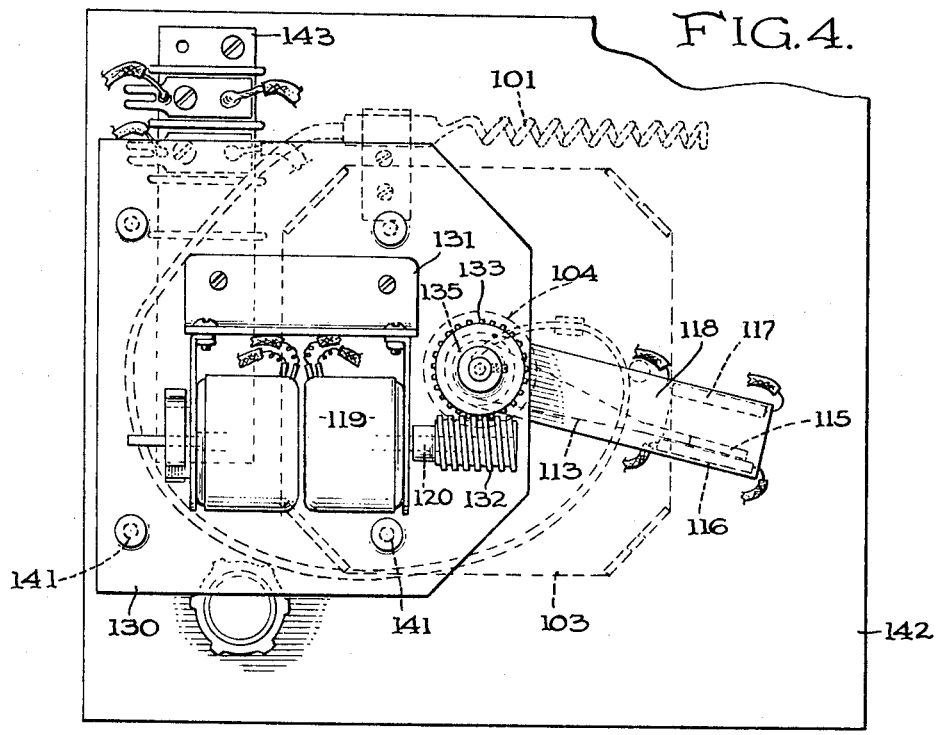
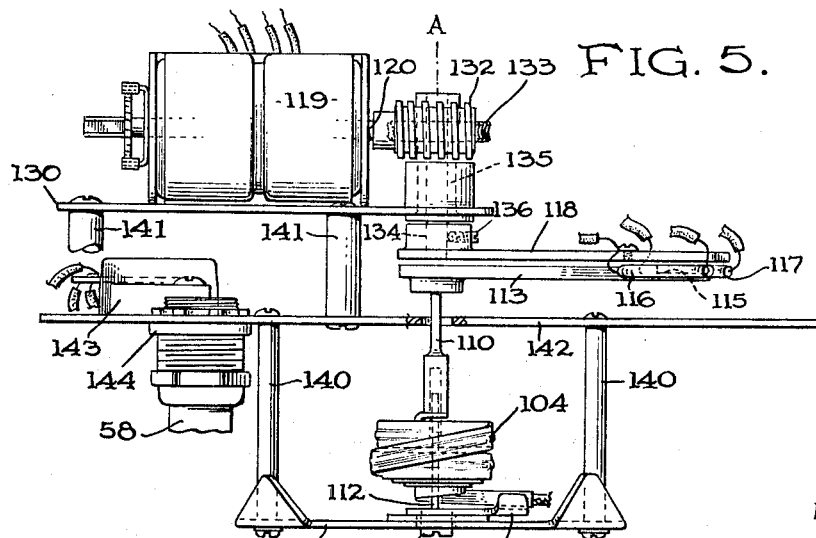

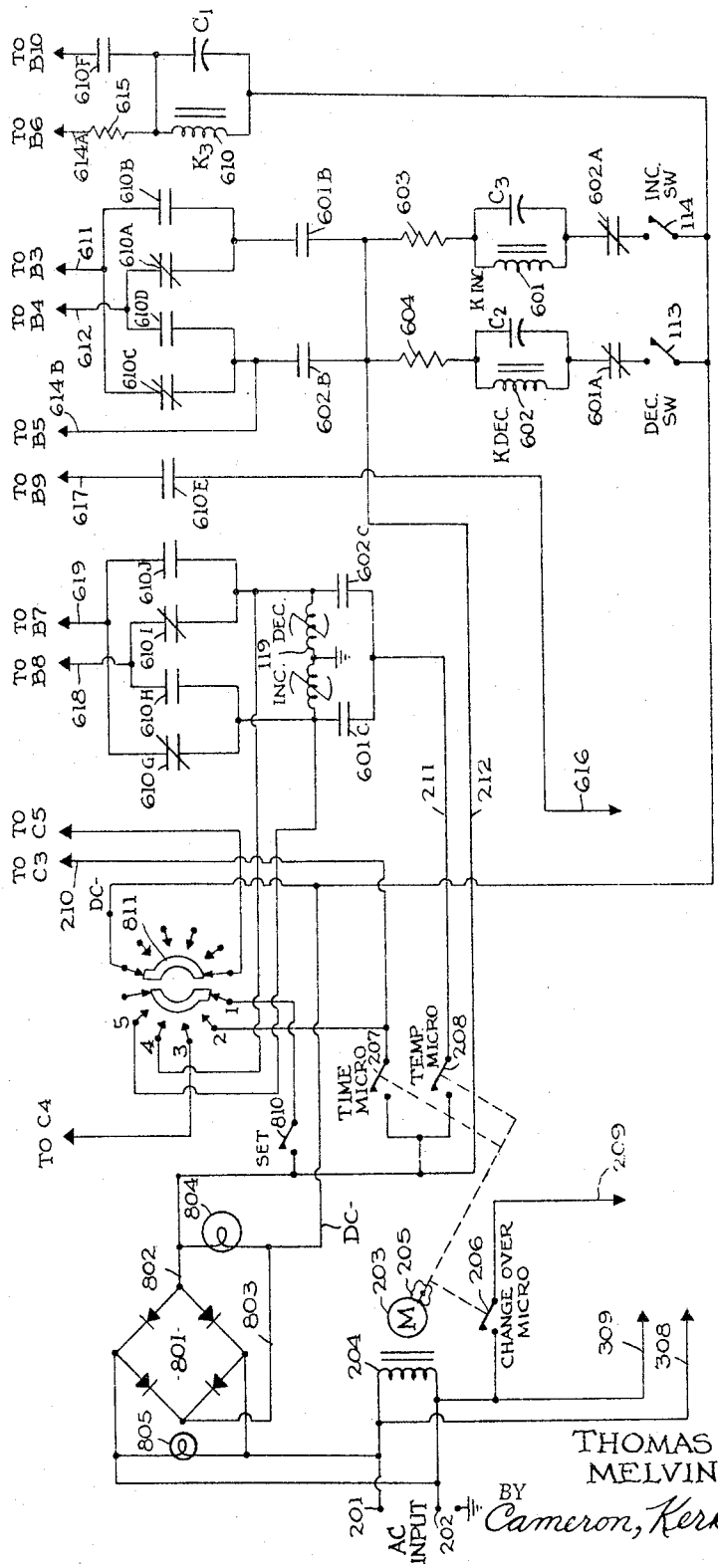

United States Patent Office 3,273,139
Patented Sept. 13, 1966

3,273,139
TIME AND TEMPERATURE DISPLAY SIGN
Thomas E. Flactiff and Melvin R. Holmes, Grand Island, Nebr., assignors to Chronolux Corporation, Grand Island, Nebr., a corporation of Nebraska
Filed Feb. 3, 1964, Ser. No. 341,869
9 Claims. (Cl. 340—334)

The present invention relates generally to display signs and more particularly to a display sign for alternately displaying a visual indication of time and temperature.

Present existing time and temperature display signs, disposed at preselected remote locations for the visual display of time and temperature, generally comprise a large number of incandescent lamps arranged to be energized in different ones of a relatively great number of combinations. Such systems require a great number of electric switches together with associated means for actuating those switches in various combinations which necessitate a complex wiring arrangement. Such arrangements are susceptible to a high probability of faulty operation and also increase the complexity of resetting or correcting circuits which are necessary to assure accurate time and temperature readings. Although reliability of such systems may be increased by utilizing precision components, these arrangements are still objectionable due to the resultant increase in cost of manufacture and the bulkiness of the system which takes up an excessive amount of valuable space.

By contrast, in accordance with the present invention, there is provided a compact and reliable time and temperature display system which is relatively simple in construction, compact in size and simplified in its wiring requirements, yet highly effective and efficient in operation. Accordingly, it is a principal object of the present invention to provide a time and temperature display system having a maximum operating life and a minimum maintenance so as to keep the display operational over a period of several years.

A further object of the present invention is to provide a time and temperature display system which provides a much larger display with a considerably reduced operating cost. Through the use of neon tubes rather than the normally used incandescent lamps, a minimum amount of tubes need to be lit to illuminate a specific numeral. Such an arrangement results in a reduced power drain while providing a display which can be more effectively observed from more distant locations.

Another object of the present invention is to provide a time and temperature display system wherein the display utilizes the same lamps for indicating both time and temperature, the lamps being energized through a simplified wiring arrangement.

A further object of the present invention is to provide an extremely sensitive and reliable temperature sensing means arranged to indicate a change in temperature, in either direction.

Still another object of the present invention is to provide a relatively simple control arrangement for resetting the time and temperature display system to enable the maintenance of an accurate display of time and temperature at all times.

In accordance with the embodiment herein illustrated and described, by way of example, there is provided a neon display panel comprising twenty-four separate strips of neon tubing for the display of time and temperature numerals plus separate neon tubing strips formed to display a colon, a degree sign, a minus sign, the word TIME while time is being displayed and the word TEMP while temperature is being displayed. Each strip is electrically connected to a separate transformer whereby the strips may be selectively energized in various combinations so as to provide a visual indication of the existing time and temperature.

For establishing the proper visual indication of time and temperature, there are provided two basic control units, a time sensing unit and a temperature sensing unit, having cooperating transfer switching circuits for interconnecting the system. The time sensing unit establishes the proper electrical connections for the time circuit through a series of rotary stepping switches under the control of a clock mechanism. The temperature sensing unit comprises an electromechanical temperature sensing device for producing an electrical control signal such as, for example, an increase or decrease pulse for each degree of increase or decrease, respectively, of temperature. These pulses are used to step bi-directional rotary stepping switches which are arranged to energize the appropriate strips of neon tubes on the display panel. For setting or resetting of the time or temperature display, a manual operated control circuit is incorporated in the system to allow for corrections to either the time or temperature readings. The manual controls of the control circuit may be arranged at any desired remote location and provide for maintenance of an accurate display of time and temperature at all times.

Although only one specific form of the invention is described and illustrated in the accompanying drawings, it is to be expressly understood that these drawings are for the purpose of illustration only and are not intended to represent the full scope of the invention identified by the appended claims which particularly point out and distinctly claim the subject matter regarding the invention. However, for a general description of the invention, reference is had to the accompanying drawings, in which:

FIG. 1 is an overall layout, partly in block diagram form, of the time and temperature display system of the present invention;

FIG. 2 is a perspective view of the temperature sensing element and reed switch actuating arrangement of the present invention;

FIG. 3 is a side elevational view, partly in cross section of the temperature sensing arrangement of FIG. 2;

FIG. 4 is a plan view of the temperature sensing module of the present invention;

FIG. 5 is a side elevational view of the temperature sensing module shown in FIG. 4;

FIG. 6 is a schematic diagram of the electrical circuits embodying the reset selector module, the time sensing module and the temperature monitor module of the present invention;

Figure 7:
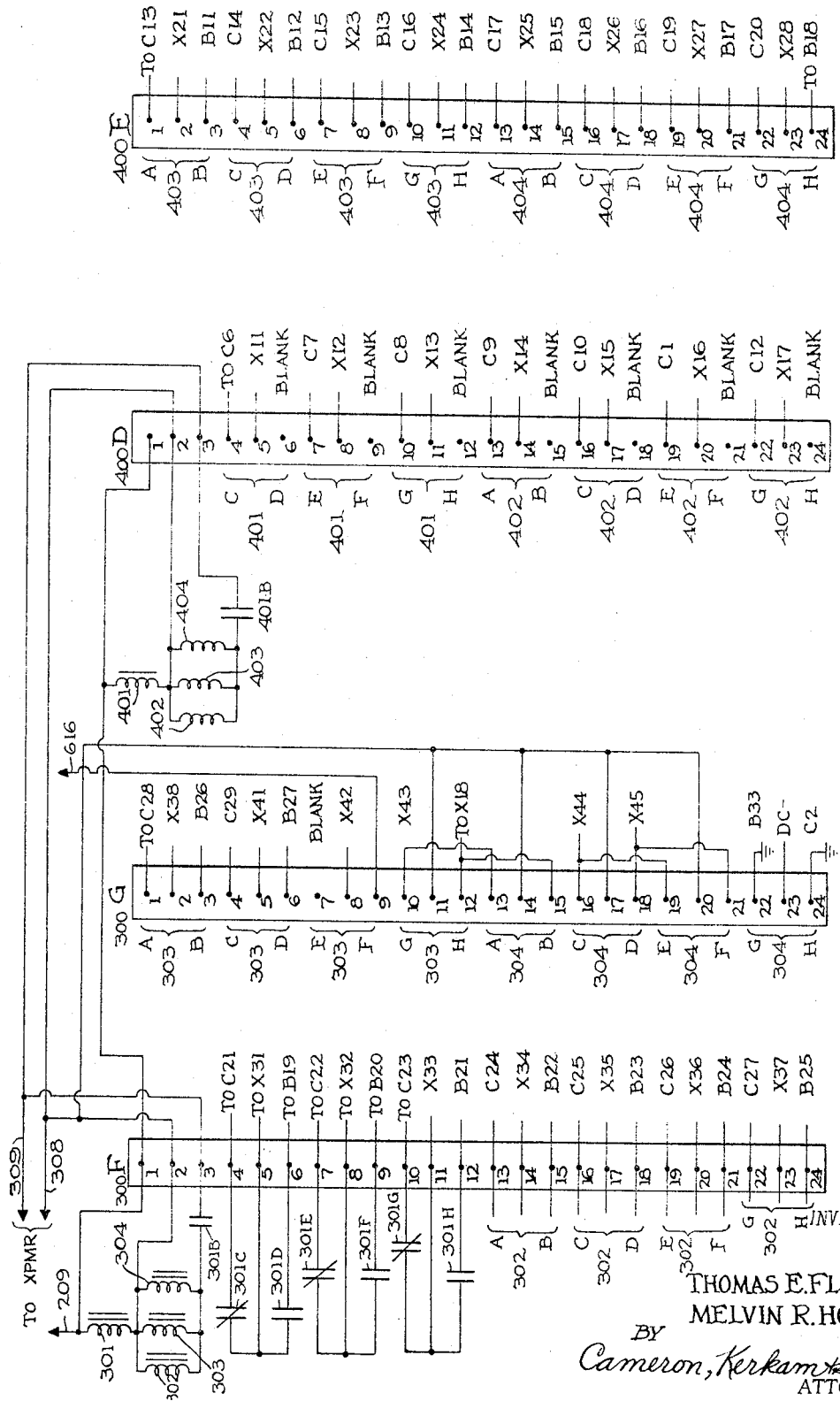
FIG. 7 is an electrical interconnection diagram for the transfer switching modules of the present invention.

Referring now to the drawings, the invention as shown in FIG. 1, is embodied in a display panel 10 that is contained within a suitable housing which is mounted at any suitable location to provide for visual display of time and temperature indications. The display panel consists of twenty-four separate strips of neon tubing arranged in four sections for the display of time and temperature numerals and five strips of neon tubing conveniently arranged for the display of various symbols.

The first section, shown at the extreme right of the display panel 10 is the UNITS section comprising neon strips 11–17 and a circular neon strip 18 representing the degree sign. This UNITS section, by proper energization of strips 11–17, displays minutes of time. The second section is the TENS sections and is formed from eight neon strips 21-28. This TENS section, in addition to displaying the tens of minutes of time, also displays the unit digits of temperature. The HUNDREDS section comprises eight neon strips 31-38 arranged to display the hours from 1 to 9 as well as the second digit of the hours 10, 11 and 12 and the tens of degrees digits of temperature. The fourth section of the display panel 10 comprises two neon strips 41 and 42. Strip 41 represents the first digit of the hours 10, 11, and 12 as well as the digit 1 for the display of temperatures in excess of 100 degrees Fahrenheit. Strip 42 indicates a minus sign for temperature when the temperature falls below 0° Fahrenheit.

The remainder of the panel consists of a separate neon strip 43 comprising two circular segments formed to display the colon and arranged between the HUNDREDS and TENS sections, time strip 44 and temperature strip 45. Neon strips 44 and 45 are conveniently located on the panel to indicate the word TIME while time is being displayed and the word TEMPERATURE while temperature is being displayed. In the preferred embodiment, only the first four letters of the word temperature are utilized to indicate TEMP which is usually sufficient to indicate that temperature is being displayed.

Each section of the display panel 10 is arranged to display a particular digit representative of time or temperature in accordance with the energization of particular neon transformers contained within the housing 10. To this end, each neon strip is connected across the secondary winding of a neon transformer having a turns ratio of approximately 20 to 1, step up, to provide an output at the secondary of approximately 2,000 volts A.C. with an input of 100 volts A.C. For convenience, each transformer is designated with a letter "$x$" followed by numeral which corresponds to the particular neon strip or segment to which the secondary windings of the transformer is connected.

The primary windings of all transformers have one end connected in common to the neutral side of the A.C. input line 46. The other end of each primary winding is connected to the control circuit of the time and temperature display unit in a manner to be hereinafter described for the energization of the transformers in the predetermined combinations. For example, as it should be readily apparent, when it is desired to indicate a temperature of 45°, transformer X45 is energized to illuminate the word TEMP. The numeral 4 is illuminated in the third or HUNDREDS section by the energization of transformers X32, X33, X36 and X37. The numeral 5 is illuminated in the TENS section by the energization of transformers X21, X23, X24, X26 and X27, and the degree sign is illuminated by the energization of the transformer X18.

The following tables illustrates the sequence of energization of the various transformers to display individual digits of time and temperature and the corresponding position of the stepping switches of the temperature and time modules. Tables 1 and 2 correspond to the temperature indication for the TENS and HUNDREDS sections, respectively and Tables 3, 4 and 5 correspond to the time indication for the UNITS, TENS and HUNDREDS sections, respectively. Table 5 also illustrates the sequence of energization of the fourth section of the display panel for the energization of neon strip 41 which represents the first digit of the hours 10, 11 and 12. An X in the block denotes the fact that the corresponding transformer is energized, while a dash denotes the fact the corresponding transformer is deenergized.

TABLE 1—TENS TEMP

| Switch Position | 1 | 2 | 3 | 4 | 5 | 6 | 7 | 8 | 9 | 10 | 11 | 12 |
|---|---|---|---|---|---|---|---|---|---|---|---|---|
| Numeral Display | 0 | 1 | 2 | 3 | 4 | 5 | 6 | 7 | 8 | 9 | Off | Off |
| X21 | X | — | X | X | — | X | X | X | X | X | — | — |
| X22 | X | — | X | X | — | — | X | X | X | X | — | — |
| X23 | X | — | — | X | X | X | X | X | X | X | — | — |
| X24 | X | — | X | X | — | X | X | — | X | X | — | — |
| X25 | X | — | X | — | — | — | X | — | X | — | — | — |
| X26 | X | — | — | — | X | X | X | — | X | X | — | — |
| X27 | — | — | X | X | X | X | X | — | X | X | — | — |
| X28 | — | X | — | — | — | — | — | — | X | — | — | — |

TABLE 2—HUNDREDS TEMP

| Switch Position | 1 | 2 | 3 | 4 | 5 | 6 | 7 | 8 | 9 | 10 | 11 | 12 |
|---|---|---|---|---|---|---|---|---|---|---|---|---|
| Numeral Display | 0 | 1 | 2 | 3 | 4 | 5 | 6 | 7 | 8 | 9 | Off | Off |
| X31 | X | — | X | X | — | X | X | X | X | X | — | — |
| X32 | X | — | X | X | — | — | X | X | X | X | — | — |
| X33 | X | — | — | X | X | X | X | X | X | X | — | — |
| X34 | X | — | X | X | — | X | X | — | X | X | — | — |
| X35 | X | — | X | — | — | — | X | — | X | — | — | — |
| X36 | X | — | — | — | X | X | X | — | X | X | — | — |
| X37 | — | — | X | X | X | X | X | — | X | X | — | — |
| X38 | — | X | — | — | — | — | — | — | X | — | — | — |

TABLE 3—UNITS TIME

| Switch Position | 1 | 2 | 3 | 4 | 5 | 6 | 7 | 8 | 9 | 10 | 11 | 12 |
|---|---|---|---|---|---|---|---|---|---|---|---|---|
| Numeral Display | 0 | 1 | 2 | 3 | 4 | 5 | 6 | 7 | 8 | 9 | Off | Off |
| X11 | X | — | X | X | — | X | X | X | X | X | — | — |
| X12 | X | — | X | X | — | — | X | X | X | X | — | — |
| X13 | X | — | — | X | X | X | X | X | X | X | — | — |
| X14 | X | — | X | X | — | X | X | — | X | X | — | — |
| X15 | X | X | X | — | — | — | X | — | X | — | — | — |
| X16 | X | X | — | — | X | X | X | — | X | X | — | — |
| X17 | — | — | X | X | X | X | X | — | X | X | — | — |

TABLE 4—TENS TIME

| Switch Position | 1 | 2 | 3 | 4 | 5 | 6 | 7 | 8 | 9 | 10 | 11 | 12 |
|---|---|---|---|---|---|---|---|---|---|---|---|---|
| Numeral Display | 0 | 1 | 2 | 3 | 4 | 5 | 0 | 1 | 2 | 3 | 4 | 5 |
| X21 | X | — | X | X | — | X | X | — | X | X | — | X |
| X22 | X | — | X | X | X | — | X | — | X | X | X | — |
| X23 | X | — | — | X | X | X | X | — | — | X | X | X |
| X24 | X | — | X | — | — | X | X | — | X | X | — | X |
| X25 | X | — | X | — | X | — | X | — | X | X | — | X |
| X26 | X | — | — | X | X | X | X | — | X | — | X | X |
| X27 | — | — | X | X | X | X | X | — | X | — | X | X |
| X28 | — | X | — | X | — | — | — | X | — | — | X | X |

TABLE 5—HUNDREDS TIME

| Switch Position | 1 | 2 | 3 | 4 | 5 | 6 | 7 | 8 | 9 | 10 | 11 | 12 |
|---|---|---|---|---|---|---|---|---|---|---|---|---|
| Numeral Display | 1 | 2 | 3 | 4 | 5 | 6 | 7 | 8 | 9 | 10 | 11 | 12 |
| X31 | — | X | X | — | X | X | X | X | X | X | — | X |
| X32 | — | X | X | X | — | — | X | X | X | X | — | X |
| X33 | — | X | X | X | X | X | X | X | X | X | — | — |
| X34 | — | X | X | — | X | X | — | X | X | X | — | X |
| X35 | — | X | — | — | — | X | — | X | — | X | — | X |
| X36 | — | — | — | X | X | X | — | X | X | X | — | — |
| X37 | — | X | X | X | X | X | — | X | X | — | — | X |
| X38 | X | — | — | — | — | — | — | — | — | — | X | — |
| X41 | — | — | — | — | — | — | — | — | X | X | X | X |

The neon strip arrangement provides a large visual display which can be easily observed from distant locations while using a minimum amount of tubes of the type which give a low power drain. In addition to the saving resulting from the low power requirements, such an arrangement enables the display panel to be controlled through a simplified wiring or control circuit arrangement. All of the control circuit and operating equipment for the time and temperature display system of the present invention with the exception of the temperature sensing module are housed within a compact cabinet or framework 50 having mounting flanges 51 for mounting the cabinet 50 on any rigid surface capable of supporting the total weight of the cabinet 50, associated wiring, internal components, etc.

For convenience of manufacturing, installation and servicing, the control circuits are arranged in individual modules each having a housing which is preferably constructed from any suitable insulative material such as, for example, Bakelite. Each module has an interconnecting plug (not shown) on its rear surface which mounts in a mating jack supported within the cabinet 50 so as to allow the various modules to be individually removed from the cabinet without disrupting the remainder of the control circuit wiring. Such an arrangement provides an extremely compact unit and facilitates repairs as well as minimizes the time in which the unit is inoperative. For example, should a fault be indicated in any of the modules, a particular module may be withdrawn and replaced with no change in wiring, permitting the fault in the withdrawn module to be corrected at the convenience of the operator.

The temperature sensor module 100 which measures the temperature and changes thereto, comprises a temperature sensing unit and electrical-mechanical components for producing an electrical signal corresponding to the temperature, all of which are located external to the cabinet 50.

As shown in FIGURE 1, the cabinet 50 houses the remaining seven modules which are: the time sensing module 200, the transfer switching modules 300 and 400, the time switching module 500, the temperature monitor module 600, the temperature switching module 700, and the reset selector module 800. The reset selector module is provided with controls which are accessible from the exterior to enable an operator to correct or adjust the time and temperature display in the event that an inaccuracy in the readings should occur. If desired, the time and temperature display system may be provided with a remote reset selector 800A having a duplicate set of controls with its electrical circuits connected in parallel to the reset selector module 800. This permits control of the time and temperature display from any desired location.

In the installation of the display sign of the present invention, the cabinet 50 containing the control circuits for the system is mounted within a building in any suitable dry location. Since the system may incorporate a remote selector, no limitation is placed on the area where the cabinet 50 is to be located. The display panel 10 is mounted on the exterior of the building at a location which permits the illuminated display to be readily visible by passers-by. The temperature sensor module 100 is preferably installed at a height of approximately 8 to 10 feet above the existing roof structure of the building within which the time and temperature display system is associated and is supported by a post 52. Wiring between the cabinet 50, the temperature sensor module 100, the remote reset selector 800A and the display panel is carried by conduits 53, in a manner known in the art, to protect the wiring from damage.

The temperature sensor module 100 is enclosed by a weather protective housing 54 which may be constructed of any suitable material such as wood or metal. The housing 54 is generally louvered to allow the temperature sensing element to be exposed to the atmosphere while being protected from adverse weather conditions. Housing 54 is supported and fastened on flange 55 which is positioned on the lower surface or the base of housing 54 and coupled to post 52. Wiring to the temperature sensor module 100 from the control circuits is brought in through conduits 53 and 58 and a suitable aperture (not shown) in the housing. Conduit 53 is supported on the post 52 by means of strap 56. A terminating junction box 57 is provided between conduits 53 and 58 for interconnecting the components of the temperature sensor module 100 to the control circuits.

The details of the interconnection of the present invention will now be described with regard to FIGS. 2–9. For the purpose of simplification of the description and to minimize confusion, each module or individual unit has been assigned a numeral corresponding to a particular series. All components physically located within a module are numbered in accordance with that series.

For example, the temperature sensor module is identified with the numeral 100 and all components physically associated within this module comprise the one-hundred series.

One important feature of the present invention is the temperature sensing module 100 which provides an accurate measurement of the existing temperature and generates a control signal responsive thereto and any changes of temperature in either direction. Referring now particularly to FIGS. 2–5, the temperature sensing module 100 comprises an expansible temperature sensing element 101 arranged to be exposed to the atmosphere. The temperature sensing element, which may be a Bourdon-type strip element, is affixed by means of clamp 102 to supporting plate 103. The expansible end of the element 101 is connected to a double spiral coil spring 104 which provides a movement of 1° circular rotation for each degree Fahrenheit of temperature change over a range of −40° F. to 130° F. without losing sensitivity over the extreme ends of the range. The connection of the double spiral element 104 to the element 101 is made by means of an adjustment clamp 105 having a threaded portion 106 extending through an aperture 107 in supporting plate 103.

Double spiral element 104 is constructed from a continuous length of spring material forming two spiralled portions positioned adjacent to each other or one above the other as shown. The lowermost spiral is arranged to have a gradually increasing radius, while the uppermost spiral is provided with a gradually decreasing radius to permit connection of opposite ends of the double spiral element 104 between temperature sensing element 101 and the rotatable shaft 110.

For adjustment of the response of the sensor to the temperature, threaded extension 106 may be provided with a suitable arrangement such as, for example, slot 110 so as to permit screw driver adjustment, or if desired, threaded extension 106 may be further extended and provided with a knob or any other suitable means to permit a rotational movement of the extension 106. Upon rotation of extension 106, the tension in the double spiral spring element 104 is either increased or decreased, depending on the direction of rotation, so as to maintain the accurate relationship between the rotational movement of the spring element 104 and the change in temperature.

The other end of the double spiral spring element 104 is attached to a rotatable shaft 110 having a hollow cylindrical integral extension 111. Within the cylindrical extension 111 there is positioned a rod 112 having one end affixed to the adjusting member 105. The portion of rod 112 which extends within the cylindrical extension 111 is entirely free therein and permits a slight vibrational movement of the shaft 110, but prevents any excessive movements of the shaft away from its axis. Double spiral element 104, rotatable shaft 110 and rod 112 each are positioned to rotate about the same vertical axis A—A to insure accuracy of the measurement over the entire range.

Affixed to the other end of shaft 110 in any suitable manner and having the same center rotation as shaft 110 is a magnet carrying arm member 113. Arm 113 may be of any suitable insulative materials such as, for example, Plexiglas, and carries in a notched portion 114, at one end thereof, a small permanent magnet 115. Magnet 115 is positioned between two reed switches 116 and 117 which are supported on a second arm 118 which overlies arm 113 and which is mechanically connected to a 12-position bi-directional stepping motor 119. Rotation of the shaft 120 of stepping motor 119 is stepped down through a 30 to 1 gear arrangement which changes each step of the bi-directional stepping motor 119 into one circular degree of rotation of the arm 118 carrying the magnetic reed switches 116 and 117.

Bi-directional stepping motor 119 and reed switches 116 and 117 are of a type well known in the art. For example, the bi-directional stepping motor may be of the Digimotor type described in U.S. Patent No. 2,959,969 and requires twelve pulses to make one shaft revolution. Therefore, each pulse gives the arm 118 1/360 of a rotation. Reed switches 116 and 117 may be of the miniature magnetic reed type well known in the art having a pair of offset, cantilever type reeds, hermetically sealed in an inert atmosphere in a suitable enclosure.

Bi-directional stepping motor 119 is mounted on plate 130 through means of a mounting clamp 131. Worm gear 132 is affixed to one end of shaft 120 of the bi-directional stepping motor 119, and is operatively connected to the reduction gear 133 so as to provide the desired gearing ratio. Reduction gear 133 may be keyed on shaft 134 by means of its hub portion and is supported for rotation through bearing 135 arranged within collar member 136. Arm 118 is rigidly connected to one end of shaft 134 and arranged for movement about vertical axis A—A in response to energization of the stepping of motor 119.

Supporting plates 103 and 130 are mounted by means of spacers 140 and 141, respectively to an intermediate supporting plate 142. A terminal board or plug and jack connection 143 may be secured to plate 142 for establishing electrical interconnection between bi-directional stepping motor 119, the magnetic reed switches 116 and 117 and the control circuits within the framework 50. To this end, the conduit 58, carrying the electrical wiring from junction box 57 is connected to flange 144 on support 142. Thus, the wiring may be conveniently connected to the terminal board 143 and the necessary connections established between the bi-directional stepping motor 119 and magnetic reed switches 116 and 117 in a manner so as to facilitate replacement of the entire unit in the event of a fault.

In operation of the circuit, the magnet 115 is initially positioned between the two magnetic reed switches 116 and 117. As the temperature sensing element records a change in temperature, the double spiral coil 104 begins to rotate in corresponding amounts, thus driving the arm 113 which carries the permanent magnet 115 towards one or the other of the two magnetic reed switches 116 and 117, depending upon whether the temperature is rising or falling. As soon as the permanent magnet 115 comes within the actuating range of the magnetic reed switch toward which it is driven, the contacts of this reed switch close establishing an electrical circuit for the bi-directional stepping motor 119. Closing of thte reed switch energizes an increase relay 601 or a decrease relay 602 (shown in FIG. 6) through the corresponding normally closed contacts 601–A or 602–A located in the temperature monitor module 600. Each of these relays also have a pair of normally open contacts 601–C and 602–C in series with the power input line 211 of the bi-directional stepping motor 119. Energization of the increase or decrease relay and the closure of the temperature microswitch 208 in accordance with a preselected timing sequence to be hereinafter described causes the increase or decrease section of the bi-directional stepping motor 119 to step the arm 118 carrying the magnetic reed switches 116 and 117 to the initial position with the magnet 115 disposed the same distance from each reed switch 116 and 117. Movement of the magnetic reed switches in this manner results in the opening of the contacts on that reed switch which was previously actuated, thus returning the circuit to normal. This operation is continuous. It should be noted, however, that the temperature microswitch 208 is closed only during the time that time is being displayed on the display panel so that changes which occur in temperature are not recorded while the temperature indication is being displayed.

Referring now in particular to FIGS. 6–9 of the drawings, the detailed electrical interconnection of the control circuits of the various modules necessary for operation of the time and temperature display system of the present invention so as to alternately display the correct time and temperature will now be described.

The time and temperature display system embodied in the present invention is designed to operate from a conventional source of A.C. power applied across input terminals 201 and 202 of the time sensing module 200. The time sensing module 200 furnishes the synchronizing pulses or control signals for the control circuit and includes a clock mechanism comprising a 110 volt A.C., 60-cycle, 1 r.p.m. synchronous motor 203 having its operating winding 204 connected across the A.C. input terminals 201 and 202. The synchronous motor 203 drives a timing cam element 205 which is arranged to actuate three micro-switches 206, 207 and 208 for establishing the predetermined timing sequence.

Micro-switch 206 is the change-over micro-switch which establishes the power connections to the operating coils of the change-over relays of the transfer switching modules 300 and 400 through line 209. This change-over micro-switch 206 is actuated by the cam element 205 alternately for periods of ten seconds, whereby power is supplied to the change-over relays 301–304 and 401–404 for ten seconds when the switch 206 is closed, and then removed from the change-over relays 301–304 and 401–404 for a period of ten seconds when the switch 206 is opened.

Time micro-switch 207, which is normally open, establishes the time pulse for the time switching module 500 and applies the pulse through line 210 to terminal C3 of the time switching module 500 once for each revolution of the cam element 305. Closing of micro-switch 207 connects line 210 to the positive side of the D.C. power source which is provided by means of a conventional full wave rectifier 801 having its input connected to the A.C. supply line terminals 201, 202 and its output taken across positive bus 802 and negative return bus 803. For convenience, D.C. and A.C. indicating lamps 804 and 805, respectively, may be provided for indicating the presence of D.C. and A.C. power.

The temperature micro-switch 208, which is normally open, is also actuated through cam element 205, once for each revolution of the motor 203, to provide a temperature pulse to the bi-directional stepping motor 119. Closing of switch 208 connects the bi-directional stepping motor 119 to the positive side of the D.C. power source through line 211 and contacts 601–C and 602–C of the increase and decrease relays 601 and 602, respectively, of the temperature monitor module 600. The extrusions on the motor-driven cam element 205 are placed in such a position as to actuate the time micro-switch 207 when the temperature is being displayed and the temperature micro-switch 208 when time is being displayed.

Operation of the circuit is such that upon a change in temperature occurring in the atmosphere which results in the magnet 115 of the temperature sensor module 100 being displaced to either direction, the temperature increase switch 114 or temperature decrease switch 113 is actuated in the manner hereinbefore described. Upon closure of either switch, the corresponding increase or decrease relay 601 or 602 is electrically connected through voltage dropping resistor 603 or 604, respectively, and power line 212 to the positive bus 802 of rectifier 801.

Increase relay 601 comprises a pair of normally closed contacts 601–A and two pairs of normally open contacts 601–B and 601–C. Decrease relay 602 is identical in construction and comprises a pair of normally closed contacts 602–A and two pairs of normally open contacts 602–B and 602–C. Each of the pairs of contacts for each relay are correspondingly positioned in their respective increase and decrease circuits. Normally closed contacts 601–A of increase relay 601 are serially connected between the operating winding of decrease relay 602 and decrease switch 113 so that upon energization of the increase circuit indicating an increase in temperature, the decrease circuit is positively disconnected from the D.C. power source. A corresponding arrangement is provided through normally closed contacts 602–A serially connected with the operating winding of the increase relay 601.

Energization of increase relay 601 upon closing of increase reed switch 114 establishes the circuit between the bi-directional stepping motor 119 and the positive bus line 802 by closure of contacts 601–C which closes the circuit between the temperature micro-switch 208 and the increase winding of the bi-directional stepping motor 119 thus rendering the bi-directional stepping motor 119 responsive to the timing control of cam element 205 and temperature microswitch 208. Decrease relay 602 has its contacts 602–C correspondingly arranged with the decrease winding of the bi-directional stepping motor 119. In addition, each relay has its normally open contacts 601–B and 602–B arranged in series with two sets of normally open and normally closed contacts 610–A, 610–B and 610–C, 610–D of relay 610. Closure of contacts 601–B establishes the circuit to the unit's bi-directional rotary stepping switch 701 of the temperature switching module 700 through contacts 610–A or 610–B of relay 610 and lines 611 or 612, respectively. Closure of contacts 602–B establishes the circuit through contacts 610–C or 610–D of relay 610 and lines 612 or 611, respectively, causing the bi-directional rotary switch 700 to step to display an increase or decrease in temperature depending upon whether the increase relay 601 or the decrease relay 602 is energized.

Relay 610 is of the slow-acting type having a 60 millisecond delay pull-in and a 60 millisecond delay drop-out to allow sufficient time for the unit's bi-directional stepping switch 701 to step past its eleventh and twelfth positions when the direction of counting is reversed as the temperature goes below 0° Fahrenheit. This relay is energized through the units and tens bi-directional rotary stepping switches 701 and 702, respectively, power being applied across the operating coil of relay 610 which has one end connected to line 614–A through voltage dropping resistor 615. Power is applied to line 614–A from line 614–B through the bi-directional stepping switches 701 and 702. The junction of resistor 615 and the operating coil of relay 610 is also connected to the power line through the holding contacts 610–F of relay 610.

Relay 610 serves to change the direction of counting of the bi-directional rotary stepping switches 701 and 702 after the temperature falls below 0 degrees Fahrenheit and also supplies power to neon transformer 42 for the minus meon strip 42 in the display panel through normally open contacts 610–E and line 616. The power connection of contacts 610–E is made, upon closure, through line 617 and terminal B9 of the temperature switching module 700.

The ADD and SUBTRACT coils of the units bi-directional rotary stepping switch 701 are electrically connected in parallel with the increase and decrease sections of the bi-directional stepping motor 119 through terminals B8 and B7 connected to line 618 and 619 and contacts 610–G, 610–H, 610–I and 610–J of relay 610. In this manner, bi-directional stepping switch 700 is caused to add or subtract a count with each actuation of the increase relay 601 or decrease relay 602.

Referring now to FIG. 7, there is illustrated the electrical circuits for the transfer switching module 300 and transfer switching module 400 which establishes the electrical connection to the time and temperature sections of the display panel. The transfer switching modules 300 and 400 house the change-over relays 301–304 and 401–404 which are energized, in a maner hereinbefore described, through lines 209 and 308 in response to the actuation of the changeover micro-switch 206. Transfer switching module 300 is provided with plug connections 300–F and 300–G and transfer switching module 400 is provided with plug connections 400–D and 400–E to allow the individual units to be conveniently plugged into corresponding jacks (not shown) provided in the cabinet 50.

Each module is similar in construction and comprises four relays having four sets of double pole contacts with the operating coils of all relays of each module connected electrically in parallel. For convenience and to simplify the drawing only a part of the contact sets of the relays 301–304 and 401–404 are shown connected to the terminals of the plugs 300F, 300G, 400D and 400E. The output connections of these plugs are designated with a letter and numeral identifying the particular component to which the output of the terminal is connected. For example, the letter B refers to the plug B of the temperature switching module 200 and the numeral following the letter B refers to the particular plug connection. The letter C refers to the plug C in the time switching module 500 and the numeral following the letter C corresponds to the plug connection. Thus, in plug 300F, terminal 4 is designated as having an external connection to C21, which is the twenty-first terminal of the plug C located in the time switching module 500.

Transfer switching module 300 includes relays 301, 302, 303 and 304. One end of operating coil of relay 301 is connected to the change-over pulse line 209 and terminal 1 of plug 300F which is in turn connected to one end of the operating coil of relay 401 and terminal 1 of plug 400D. The other end of the operating coil of relay 301 is connected in common with one end of the operating coils of relays 302, 303, 304 and terminal 2 of plug 300F. The other end of operating coils of relays 302, 303 and 304, are connected in common through the normally open contact 301–B of relay 301 through terminal 3 of plug 300F to line 309. Terminals 2 and 3 of plug 300F provide power to the change-over relays 301–304 and are connected through lines 308 and 309 to the A.C. input terminals 201 and 202, respectively.

The circuit arrangement of relays 401–404 is similar to that of relays 301–304 with connections being made to plug D. Although each relay is provided with four sets of normally opened and normally closed contacts, relays 301 and 401 are arranged to utilize only the normally open contacts 301B and 401B of the first set to connect the operating coils in parallel. The remaining sets of contacts are arranged as shown, in sets. Each set is connected to three terminals of a plug, the upper normally closed contact being connected to one terminal, the normally open contact being connected to a second terminal and the common connection between the normally open and normally closed contact being connected to a third terminal, this arrangement is consistent for all sets of contacts with the exception of the first set for relays 301 and 401 which are connected in a manner hereinbefore described.

Since relays 301 and 401 are energized in response to the change-over pulse occurring upon the closing of microswitch 206, all relays 301 to 304 and 401 to 404 are alternately energized and de-energized in response to this pulse. It should be readily apparent that both transfer switching modules 300 and 400 operate in an identical manner to establish the electrical connection between the time section and temperature section of the display panel 10 and the time switching module 500 and temperature switching module 700.

Transformers X11 to X17 of the UNITS section are energized from plug 400D in response to the energization of relays 401 and 402. Relays 403 and 404 control the energization of transformers X21 to X28 through plug 400E, while transformers X18, X38 and X41 to X45 are energized under the control of relays 303 and 304 through plug 300G. The HUNDREDS section transformers X31 to X37 are energized in response to the energization of relays 301 and 302 through plug 300F. The relays are energized through the change-over micro-switch 206 for alternate periods of 10 seconds as hereinbefore described so that the circuits between the time section and the display panel are closed for the 10 second period while the circuits between the temperature section and the display panel are open for this period. When the relays are de-energized, the contact arrangement is reversed.

Figure 8:
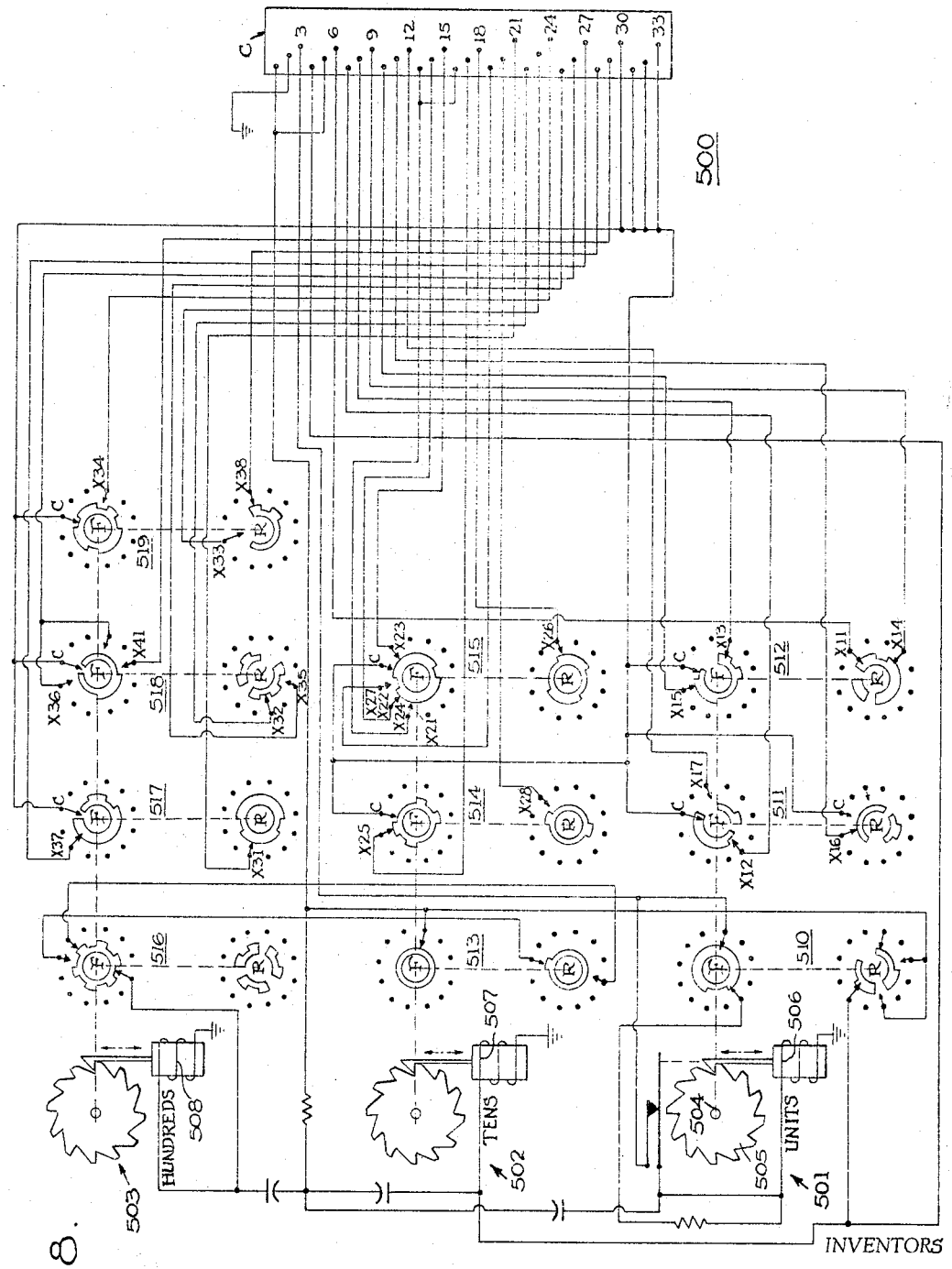
FIG. 8 is an electrical wiring diagram showing the manner of interconnection of the rotary stepping switches of the time module.

Referring now to FIG. 8, there is shown the time switching module 500 which comprises three multiple wafer rotary stepping switches 501, 502 and 503. In the preferred embodiment, each switch 501, 502 and 503 utilizes a 12 position stepping motor for rotating the wafers to the desired position. Rotary stepping switch 501, which controls the minutes display in the UNITS section of the display panel 10, receives one pulse each minute through terminal 3 of plug C in response to the actuation of the time micro-switch 207 as hereinbefore described.

Switch 501 comprises three sections of wafers 510, 511 and 512 each having a front and rear section designated by an F and an R, respectively, mounted on the switch shaft 504 which is rotated by means of stepping wheel 505 affixed to the shaft 504. Stepping wheel 505 is caused to rotate once upon each pulse applied to the operating coil 506 of the stepping motor 501 causing the wafer sections 510, 511 and 512 to be correspondingly positioned.

Switches 502 and 503 operate in a similar manner, and since such switches are conventional and well known in the art a further detailed description of their structure will not be given, it being understood that the configuration of the wafers of each section are preselected to give the desired contact arrangement.

The first wafer section 510 of switch 501 is arranged to energize the coil 507 of the TENS rotary stepping switch 502 once each ten steps of the UNITS rotary stepping switch 501, and self-interrupts the input power signals to allow the UNITS rotary stepping switch 501 to step past the 11 and 12 positions, as only 10 positions are needed to display minutes or units of time. The second and third wafer sections 511 and 512, respectively, have their contact terminals arranged to supply power to various combinations of neon transformers, as illustrated, to illuminate any designated number.

The TENS rotary stepping switch 502 also comprises three wafer switch assemblies or sections 513, 514 and 515 and is stepped once every ten minutes through wafer section 510 of switch 501. Wafer section 513 has its contacts arranged to supply power to the operating coil 508 of the HUNDREDS stepping switch 503 to display units of hours once each six steps of the TENS rotary stepping switch 502. The second and third wafer sections 514 and 515 are arranged to supply power in various combinations to the neon transformers in the TENS section of the display panel 10 to illuminate the proper tens of minutes digit.

The HUNDREDS rotary stepping switch 503 steps once each hour and comprises four wafer sections 516, 517, 518 and 519. Wafer section 516 is used in conjunction with wafer section 513 of the TENS rotary stepping switch 502 to cause it to step itself once each six steps of the TENS rotary stepping switch. The remaining wafer sections 517 to 519 are arranged to supply power to the neon transformers in the HUNDREDS section of the display panel to display hours of time.

Referring to FIG. 8, the various wafer switch assemblies, as shown, are set to present a display of 1 o'clock. Thus, transformers X11 to X16 are energized to illuminate the neon strips 11 to 16 representing the zero digit in the UNITS section; transformers X21 to X26 are energized to illuminate the neon strips 21 to 26 representing the zero digit in the TENS section; and transformer X38 is energized to illuminate the neon strip 38 representing the ones digit in the HUNDREDS section. Transformers X43 and X44, for illuminating the colon and TIME neon strips at the display panel, are automatically energized for 10 second periods through relays 303 and 304 in response to the change-over pulse as hereinbefore described. By observing the positions of the wipers and wafers of each section, it will be seen that the proper connections are established to energize the designated transformers through the transfer switching modules 300 and 400. To this end, and to avoid confusion, each wiper arm connection is designated to identify the particular neon transformer to which they supply power. The output of the wafer sections go directly to the neon transformers via the change-over or transfer switching relay contacts.

After a minute has elapsed, the timing cam 205 actuates the time micro-switch 207 causing the UNITS rotary stepping switch 501 to be pulsed and stepped one position. This causes a rotation of the wafer sections 510, 511 and 512 clockwise one position removing the energizing power from transformers X11 to X14. However, power is maintained on transformers X15 and X16 through the forward wafer section 512 and the rear wafer of section 511. The display panel then displays an increase of time of one minute or 1:01.

The temperature section of the present invention comprises the electrical and mechanical means for producing an increase or decrease electrical control pulse for each degree of temperature change. These pulses are produced in the manner hereinbefore described and are used to energize the rotary bi-directional stepping switches of the temperature switching module 700 which in turn cause the proper neon transformers to be energized so as to display the proper temperature at the display panel 10. The temperature switching module 700, like all other modules within cabinet 50, is housed in a suitable insulative housing and is provided with a plug B for establishing the electrical interconnection to the other circuits of the time and temperature display system and facilitate rapid replacement of the module when necessary.

Figure 9:
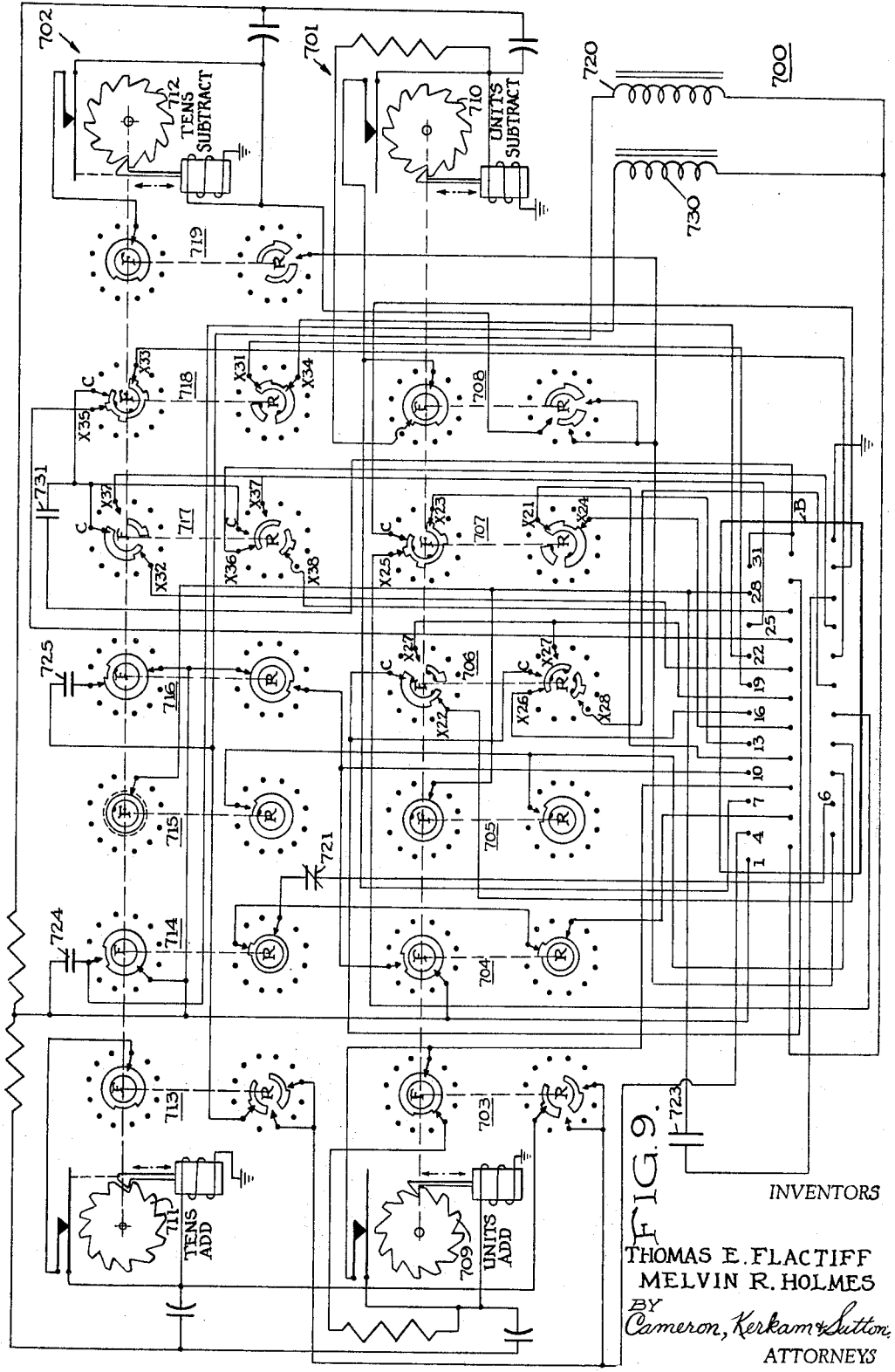
FIG. 9 is an electrical wiring diagram showing the manner of interconnection of the rotary stepping switches of the temperature module.

Referring to FIG. 9, the temperature switching module comprises two bi-directional stepping switches 701 and 702 arranged to energize the proper transformers in the TENS and HUNDREDS section of the display panel. The "units" bidirectional rotary stepping switch 701 comprises a six section wafer and wiper assembly 703–708 arranged to provide the desired sequence of interconnection to the neon transformers of the TENS section of the display panel, and the "tens" bi-directional rotary stepping switch 702 comprises a seven section wafer and wiper assembly 713–719 arranged to provide the desired sequence of interconnection to the neon transformers of the HUNDREDS section of the display panel.

Upon energization of the increase relay 601 or decrease relay 602, the circuit between the temperature micro-switch 208 and the bi-directional stepping motor 119 is established through the closing to the corresponding increase or decrease relay contacts 601–C or 602–C. Power is then applied to the bi-directional stepping motor 119 upon closing of the temperature micro-switch 208 causing the bi-directional stepping motor 119 to step the appropriate reed switch away from the permanent magnet 115. Thus, an increase or decrease pulse is obtained for each degree of temperature change.

The "units" bi-directional rotary stepping switch 701 is connected directly in parallel with the bi-directional stepping motor 119 and, therefore, counts up or down with each actuation of the increase or decrease relays 601, 602, respectively. To this end, "units" bi-directional rotary stepping switch 701 comprises two stepping motors 709 and 710. Stepping motor 709 counts up or adds for an increase in temperature and receives its energizing power through terminal 8 of plug B connected to line 618, while stepping motor 710 counts down or subtracts and is energized through terminal 7 of plug B connected to line 619.

Operation of the individual motors is similar to that described in connection with stepping motors 501, 502 and 503 of the time switching module 500. Motors 709 and 710 drive the common set of stepping switch wafers 703–708, which are of preselected configuration, in opposite directions so as to give the desired making sequence. Wafer section 703 is arranged to energize the operating coil of the "tens" add bi-directional stepping motor 711 once each ten steps of the "units" add bi-directional stepping motor 709 and self-interrupts the input power signal to allow the "units" add bi-directional stepping motor 709 to step past the eleven and twelve positions of this switch, as only ten positions are needed to display "units" of temperature.

Wafer section 704 is used in conjunction with wafer section 714 of the "tens" bi-directional stepping switch 702 to energize the hundreds relay 720 and the minus relay 610 when the switches are in the proper designated positions. Wafer section 705 is connected to be used in conjunction with wafer section 715 of the "tens" bi-directional stepping switch 702 to display the digit 1 of the numeral 100 when the temperature goes above 99° Fahrenheit. Wafer sections 706 and 707 are provided with the necessary configuration to establish the proper power circuits to combinations of the neon transformers in the display panel for illumination of the designated "units" digit of temperature. As in the case of the time switching module 500, each wiper is designated to indicate the particular neon transformer to which power is supplied. The last wafer section 708 serves to step the "tens" subtract operating coil of stepping motor 712 once each ten steps of the "units" subtract stepping motor 710 and also serves to self-interrupt the input power signal to allow the "units" subtract stepping motor 710 to step past the eleven and twelve positions of this switch.

The "tens" bi-directional rotary stepping switch 702 is stepped one position up or down for each ten steps of the units switch 701 and is similar in construction thereto with the exception of the provision of one additional wafer section. The "tens" add rotary stepping motor 711 is driven by the impulses translated through wafer section 703 and the "tens" subtract rotary stepping motor is driven by impulses translated through wafer section 708. Stepping of the motors 711 or 712 positions the wafer sections 713–718 which are of preselected configuration to establish the proper contact sequence for energizing the proper neon transformer at the display panel.

Wafer section 713 serves to interrupt the input power to stepping motor 712 to allow this motor to step past the eleven and twelve positions of the "tens" add section. Wafer sections 714 and 716 are arranged in connection with wafer section 704 of the "units" bi-directional rotary stepping switch 701 to energize the hundreds relay 720 and the minus relay 610 when the wipers are in the proper designated positions. Hundreds relay 720 comprises one normally closed pair of contacts 721 connected between one wiper of the forward wafer of wafer section 714 and terminal 3 of plug B and three normally open pairs of contacts 723, 724 and 725. All relay contacts are shown in their normally de-energized condition.

Contacts 723 when closed establishes the circuit to the forward wafer of wafer section 715, while contacts 724 and 725 establish the circuit to the upper wiper arms for the forward wafers of wafer sections 714 and 716. Wafer section 715 operates in conjunction with wafer section 705 of the "units" bi-directional rotary stepping switch to supply power to neon transformer X41 to display the digit 1 of the numeral 100 when the temperature rises above 99° Fahrenheit. Wafer sections 717 and 718 have a prearranged configuration to establish the circuits to various combinations of neon transformers in the display panel to illuminate any designated numeral on the HUNDREDS section. Power circuits to the wafer sections 717 and 718 are established on the energization of the tens relay 730 which causes normally open contacts 731 to close thereby connecting the common return line designated as C to terminal 32 of plug B. Wafer section 719 is utilized to interrupt the power to the "tens" subtract stepping motor 712 to allow the motor to step past the eleven and twelve positions of the bi-directional rotary stepping switch 702.

As shown in FIG. 9, the various wafer switch sections are set to illuminate the display panel for an indication of 0° Fahrenheit. Thus, transformers X21 to X26 of the TENS section are energized to illuminate neon strips 21 to 26, and transformers X31 to X36 are energized to illuminate neon strips 31 to 36 of the HUNDREDS section. Transformer X18 is energized to illuminate the degree sign, and transformer X45 is energized to illuminate the word TEMP every ten seconds as hereinbefore described.

It a temperature increase of one degree occurs, the temperature sensing element 104 causes an increase electrical control impulse to be produced which steps the "units" add stepping motor 709 to step one position thus rotating the wafer sections 703 to 708 one position or step clockwise. It should be noted from table 4 that for a display of 1° Fahrenheit, only transformer X28 is energized in the TENS section and the HUNDREDS section remains unchanged. Observing the conditions of wafer sections 706 and 707, it is seen that for a clockwise step of one degree, all previous wiper connections to the wafer sections are broken and a connection is made to transformer X28 through terminal 19 of plug B, the X28 wiper of the rear wafer, through the internal wafer connection to the common C wiper of the forward wafer to the common line terminal 29 of plug B. Transformer X28 is thus energized and the panel displays an increase of temperature of one degree or 01°.

Although the time and temperature display sign of the present invention is capable of presenting an accurate display of time and temperature over long periods, the need occasionally arises for adjustment of the time or temperature indication. For example, when changing from Daylight Saving time to Eastern Standard time, the time indication must be reset accordingly. To provide for such time and temperature adjustment there is provided a reset selector module 800 comprising a manually operated switch 810 which may be of the push button type and a rotary wafer type selector switch 811. Rotary switch 811 may be positioned to set units of time, tens of minutes of time, increase in temperature or decrease in temperature.

Referring to FIG. 6, rotary selector switch is shown in its OFF position with the extending portion of the wafer in position 1 to which the positive D.C. line 802 is connected by means of set switch 810. To set time, selector switch 811 is placed in position 2 which is connected to terminal 3 of plug C of the time switching module 500 through line 210. Switch 810 may then be closed for each minute to be advanced. The pulse established by closing of switch 810 serves to step the units time stepping motor 506. For stepping tens of minutes, rotary selector switch is advanced to position 3 which is connected to the operating coil of the tens stepping motor through terminal 4 of plug C. It should be noted, that units of hours can only be advanced by depressing the set switch 810 six times while the selector switch is in the tens of minutes position. The same procedure is followed for temperature adjustments; however, temperature can either be decreased or increased as desired since closing of switch 810 while the selector switch is in position 4 or 5 will serve to energize the decrease or increase winding, respectively, of motor 119.

From the foregoing description, it is apparent that there is provided a compact and efficient time and temperature display system having sensitive and reliable control means for effecting a continuous display of time and temperature. Although only one particular embodiment of the invention has been described, it will be obvious to those skilled in the art that the inventive concept is capable of a variety of modifications. It is therefore intended by the appended claims to cover all such modifications which fall within the true scope of the invention.

What is claimed is:

1. A time and temperature display sign comprising a display panel having a plurality of neon strips, said strips being connected to a plurality of separate circuits for energization in various combinations to provide a visual indication of time and temperature including a first plurality of switches operable for selectively energizing said strips to display a visual indication of time, a second plurality of switches operable for selectively energizing said strips to display a visual indication of temperature, transfer switching means for interconnecting said first and second plurality of switches to said strips, a clock mechanism including a motor driven cam, a power source, means connecting said power source to said clock mechanism, switch means arranged to be actuated by said cam for establishing a predetermined timing sequence of interconnection of said first and second plurality of switches and for generating a time signal to set said first plurality of switches, and temperature sensing means operably connected to said second plurality of switches for generating a temperature signal to set said second plurality of switches in response thereto including a temperature sensitive element for measuring temperature, a magnetic element connected to said temperature sensitive element and mounted for movement in response to changes in temperature, switch means movably supported adjacent said magnetic element and actuable in response to movement of said magnetic element and relay means serially connected in circuit with said switch means for energization in response to actuation of said last named switch means to effect setting of said second plurality of switches.

2. A time and temperature display sign comprising a display panel having a plurality of neon strips each strip being connected to a separate energizing transformer, said transformers being connected to a plurality of separate circuits for energization in various combinations to provide a visual indication of time and temperature including a first plurality of switches operable for selectively energizing said strips to display a visual indication of time, a second plurality of switches operable for selectively energizing said strips to display a visual indication of temperature, transfer switching means for interconnecting said first and second plurality of switches to said energizing tranformer, a clock mechanism including a motor driven cam, a power source, means connecting said power source to said clock mechanism, a third plurality of switches arranged to be actuated by said cam to establish a time signal for setting said first plurality of switches and a change-over signal for energizing said transfer switching means, a temperature sensing unit for producing an electrical control signal in response to temperature including a temperature sensing element for measuring temperature, a magnetic element connected to said temperature sensitive element and mounted for movement between a pair of magnetically actuable switches in response to changes in temperature, said pair of switches being movably supported adjacent said magnetic element such that one of said pair of switches is actuated in response to movement of said magnetic element away from a neutral position, and relay means serially connected in circuit with said switch means for energization in response to actuation of said last named switch means to connect said temperature sensing unit to said second plurality of switches for setting said second plurality of switches in response to said control signal and a stepping motor adapted to be energized upon actuation of said third plurality of switches and drivingly connected to said movably supported pair of switches to position said pair of switches in the neutral position.

3. The time and temperature display sign as set forth in claim 1 wherein said switch means supported adjacent said magnetic element comprises a pair of switches said magnetic element being supported between said switches and arranged for movement towards one or the other of said switches in response to temperature and further including a bi-directional motor for driving said movably supported pair of switches, and means for connecting said bi-directional motor to said power source in response to the actuation of the switch actuated by the motor driven cam to return said movably supported switches to a neutral position, such that said magnetic element is disposed between said pair of switches in a neutral position.

4. A time and temperature display sign comprising a display panel having a plurality of neon strips each being connected to a separate energizing transformer, said transformers being connected to a plurality of separate energizing circuits for energization in various combinations to provide a visual display of time and temperature including a plurality of uni-directional rotary stepping switches operable for selectively energizing said transformers to display a visual indication of time, a plurality of bi-directional rotary stepping switches operable for selectively energizing said transformers to display a visual indication of temperature, transfer switching means for alternately interconnecting said uni-directional rotary stepping switches and said bi-directional rotary stepping switches to said transformers, a power source, a clock mechanism connected to said power source including a motor driven cam and a switch arranged for actuation by said cam in a predetermined timing sequence, means connecting said uni-directional rotary stepping switch to said power source whereby actuation of said switch establishes a signal with respect to time for setting said uni-directional rotary stepping switches, temperature sensing means connected to said bi-directional rotary stepping switches for setting said bi-directional rotary stepping switches with respect to temperature including a temperature sensitive element for measuring temperature, a magnetic element connected to said temperature sensitive element and mounted for movement in response to changes in temperature, a pair of magnetically actuable switches movably supported adjacent said magnetic element and actuable in response to movement of said magnetic element, relay means serially connected in circuit with said switch means for energization in response to actuation of one of said pair of switches and a stepping motor arranged to be energized upon actuation of said motor driven cam to position said pair of switches such that said magnetic element is disposed between said pair of switches in a neutral position, and means connecting said transfer switching means to said power source including a change-over switch arranged to be actuated by said motor driven cam for establishing a predetermined timing sequence of interconnection of said uni-directional rotary stepping switches and said bi-directional rotary stepping switches.

5. The time and temperature display sign set forth in claim 4 wherein said temperature sensitive element is arranged to be exposed to the atmosphere and includes a spring element having one end connected to said temperature sensitive element and arranged to be flexed in response to changes in temperature and its other end connected to said magnetic element for movement thereof in response to changes in temperature.

6. A time and temperature display sign comprising a display panel having a plurality of neon strips, said strips being connected to a plurality of separate circuits for energization in various combinations to provide a visual indication of time and temperature including a first group of switches operable for selectively energizing said strips to display a visual indication of time, a second group of switches operable for selectively energizing said strips to display a visual indication of temperature, transfer switching means for interconnecting said first and second groups of switches to said strips, a power source, a clock mechanism connected to said power source arranged for setting said first group of switches with respect to time and interconnecting said first and second group of switches to said strips in a predetermined timing sequence, and a temperature sensing unit arranged for measuring temperature and setting said second group of switches with respect to temperature including a temperature responsive element arranged to be exposed to the atmosphere, a spring element having one end connected to said temperature responsive element and arranged to be flexed in response to changes in temperature, magnetic actuating means connected to the other end of said spring element for movement in response to flexing thereof, a first switch arranged to be actuated upon movement of said magnetic actuating means in response to an increase in temperature, a second switch arranged to be actuated upon movement of said magnetic actuating means in response to a decrease in temperature, means for movably supporting said first and second switches adjacent said magnetic actuating means, circuit means including a first relay serially connected to said first switch and arranged to be energized upon an increase in temperature and a second relay serially connected to said second switch arranged to be energized upon a decrease in temperature, each of said first and second relays having a plurality of contacts actuated in response to the energization of their respective relays for operably connecting said second group of switches to add and subtract counts to the visual temperature indications displayed by said neon strips in response to energization of said first and second relays, respectively.

7. The time and temperature display sign as set forth in claim 6 wherein said magnetic actuating means is disposed between said first and second switches and further including a bi-directional motor arranged to be driven to position said means for movably supporting said first and second switches are de-actuated.

8. The time and temperature display sign as set forth in claim 7 wherein said first group of switches comprise uni-directional rotary stepping switches representing progressively higher order digits, said second group of switches comprise bi-directional stepping switches representing progressively higher order digits, and said bi-directional motor is connected electrically in parallel with the bi-directional stepping switch representing the lowest order digit.

9. The time and temperature display sign as set forth in claim 8 further including manually operated means for setting and resetting the visual display including a control switch for individually connecting said first and second group of switches to said power source and a set switch for establishing a control signal for energizing said first and second group of switches in response to the actuation of said set switch.

References Cited by the Examiner

UNITED STATES PATENTS

| | | |
|---|---|---|
| 1,096,779 | 5/1914 | Clement. |
| 1,835,907 | 12/1931 | Shiland _____ 318—31 X |
| 1,906,960 | 5/1933 | Harris. |
| 2,043,590 | 6/1936 | Norwood _____ 73—368 |
| 2,077,086 | 4/1937 | Adair _____ 318—31 |
| 2,144,762 | 1/1939 | Kendall _____ 73—368 |
| 2,290,261 | 7/1942 | Welch _____ 340—336 |
| 2,309,205 | 1/1943 | Nevinger _____ 340—336 X |

(Other references on following page)

UNITED STATES PATENTS

| | | | |
|---|---|---|---|
| 2,475,269 | 7/1949 | Yardney | 318—31 |
| 2,673,976 | 3/1954 | Williams | 340—338 |
| 2,917,733 | 12/1959 | Justus | 340—336 X |
| 3,041,596 | 6/1962 | Caferro | 340—338 |
| 3,056,865 | 10/1962 | Reardon | 340—266 X |

FOREIGN PATENTS

| | | |
|---|---|---|
| 466,861 | 6/1937 | Great Britain. |
| 528,624 | 11/1940 | Great Britain. |

NEIL C. READ, *Primary Examiner.*

R. M. GOLDMAN, *Assistant Examiner.*

UNITED STATES PATENT OFFICE
CERTIFICATE OF CORRECTION

Patent No. 3,273,139　　　　　　　　　　　　　　September 13, 1966

Thomas E. Flactiff et al.

It is hereby certified that error appears in the above numbered patent requiring correction and that the said Letters Patent should read as corrected below.

Column 10, line 50, for "meon" read -- neon --; line 70, for "maner" read -- manner --; column 13, line 43, for "bi-directional" read -- bi-directional --; column 14, line 6, after "desired" insert -- contact --; column 15, line 21, for "It" read -- If --; line 33, for "19" read -- 18 --; column 18, line 43, after "switches" insert -- in a neutral position such that said first and second switches --.

Signed and sealed this 1st day of August 1967.

(SEAL)
Attest:

EDWARD M. FLETCHER, JR.　　　　　　　　　　　EDWARD J. BRENNER
Attesting Officer　　　　　　　　　　　　　Commissioner of Patents